July 12, 1927.

A. F. SAUNDERS

TEAPOT CONSTRUCTION

Filed Jan. 27, 1926

1,635,639

INVENTOR.
Albert F. Saunders
BY
Parsons & Bodell.
ATTORNEYS.

Patented July 12, 1927.

1,635,639

UNITED STATES PATENT OFFICE.

ALBERT F. SAUNDERS, OF SYRACUSE, NEW YORK, ASSIGNOR TO T. N. BENEDICT MFG. CO., OF EAST SYRACUSE, NEW YORK, A CORPORATION OF NEW YORK.

TEAPOT CONSTRUCTION.

Application filed January 27, 1926. Serial No. 83,992.

This invention relates to tea pots and the like or any other article in which the liquid is poured and is to be kept hot, that is any article that is not itself to be heated on the stove and it has for its object a construction of a tea pot or similar article by which the exterior remains cool and the handle is kept cool without insulators and the like.

The invention consists in the novel features and in the combinations and constructions hereinafter set forth and claimed.

In describing this invention reference is had to the accompanying drawings in which like characters represent corresponding parts in all the views.

Figure 1:
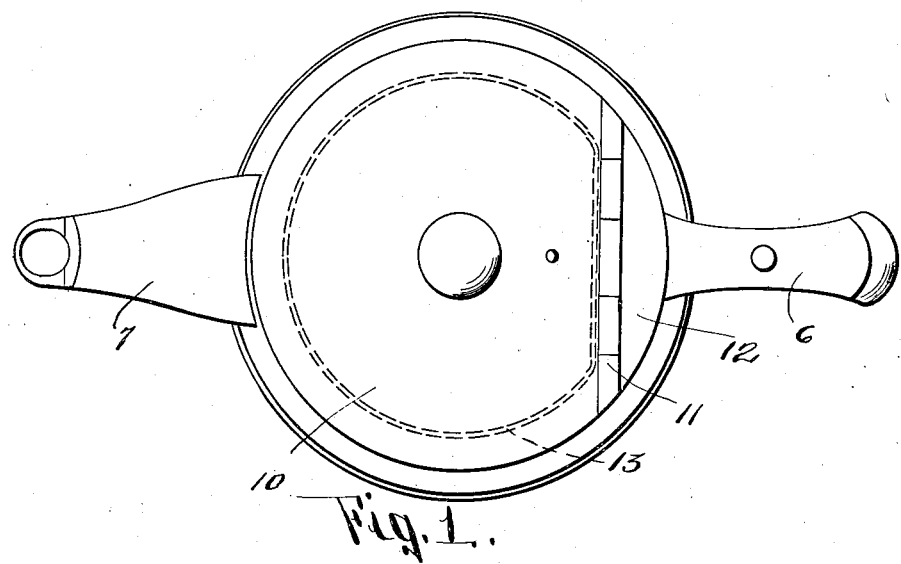
Figure 1 is a plan view of a tea pot embodying my invention.
Figure 2:
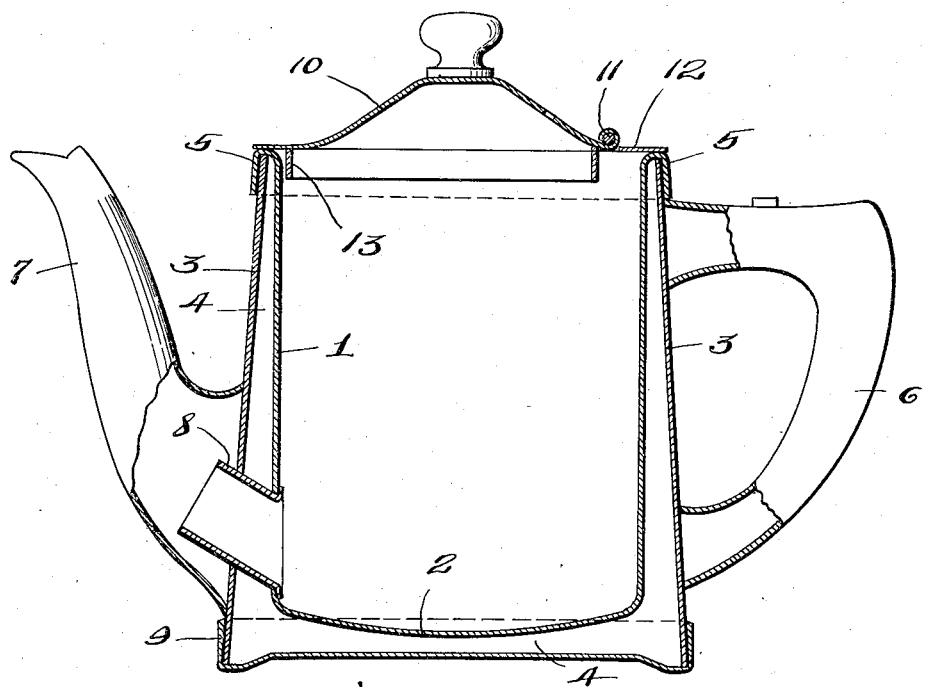
Figure 2 is a vertical sectional view partly in elevation.

This tea pot or similar article comprising an inner receptacle having a side and bottom, an outer shell having a side and a bottom, this receptacle and shell forming the body of a double walled tea pot, in which the inner receptacle is spaced apart from the outer shell around the side and the bottom thereof, a handle mounted on the outer shell and a spout mounted on the outer shell and communicating with the receptacle.

1 designates the inner receptacle of the body, it having a rounding bottom 2.

3 is the outer shell, the receptacle being spaced apart from the shell forming a heat insulating space 4 between the receptacle and the shell. The receptacle and shell are joined together at their upper edges so that the receptacle depends into the shell, and as here shown the receptacle is formed with an outwardly and downwardly turned flange 5, the depending portion of which is secured to the double margin of the shell 3 as by soldering.

6 is the handle secured at its ends to the outer shell as by soldering, it being unattached to the inner receptacle 1, so that heat from the receptacle cannot be radiated to the handle, and hence no heat insulators are embodied in the handle construction. As will be understood by those skilled in the art, handles having heat insulators embodied therein are frail and unsatisfactory.

In my construction of tea pot the insulators built into the handles are eliminated.

7 is the spout secured as by soldering to the outer shell 3, this spout communicating with the receptacle preferably through an inner spout 8 secured as by solderng to the receptacle and extending through the shell into the spout 7. The spout 8 is preferably in line with the rounding bottom of the receptacle 1.

A reinforcing band 9 encloses the lower margin of the shell.

10 is the cover which is hinged at 11 to a top plate 12, soldered to the upper edge of the receptacle 1, the cover having a depending flange 13 fitting into the upper end of the receptacle, this flange conforming to the outlne of the cover.

This construction of tea pot or similar article is particularly advantageous in that the contents can be kept hot while the exterior of the pot is cool, also owing to its construction the handle cannot become hot. Owing to the rounding bottom to a receptacle 1, the pot can be easily and thoroughly cleaned.

Although I have shown my invention as embodied in the tea pot obviously it can be embodied in any other container especially one having a handle.

What I claim is:—

A tea pot and the like comprising an inner receptacle and an outer shell, each comprising side walls and a bottom, the side walls and the bottom of the inner receptacle being spaced apart from the side walls and the bottom of the outer shell providing a heat insulating space, a spout mounted on the shell and an inner spout leading from the receptacle through the wall of the outer shell into the former spout, a handle carried by the outer shell, the inner shell being formed at its upper end with an outwardly and downwardly turned flange overlying the edge and upper margin of the outer shell and forming a reinforcing band therefor.

In testimony whereof, I have hereunto signed my name, at Syracuse, in the county of Onondaga, and State of New York, this 25th day of January, 1926.

ALBERT F. SAUNDERS.